United States Patent [19]

Karlsson et al.

[11] Patent Number: 5,542,386
[45] Date of Patent: Aug. 6, 1996

[54] INTAKE SYSTEM FOR MULTIPLE CYLINDER COMBUSTION ENGINES

[75] Inventors: Jan Karlsson, Västra Frölunda; Jan Dahlgren, Göteborg, both of Sweden

[73] Assignee: AB Volvo, Goteborg, Sweden

[21] Appl. No.: 268,567

[22] Filed: Jul. 6, 1994

[30] Foreign Application Priority Data

Jul. 8, 1993 [SE] Sweden ................... 9302368

[51] Int. Cl.⁶ ................... F02B 27/02
[52] U.S. Cl. ................... 123/184.57
[58] Field of Search ............ 123/184.53, 184.55, 123/184.57, 184.59, 184.25, 184.76, 184.35, 184.36, 184.43, 184.44, 184.48, 184.49

[56] References Cited

U.S. PATENT DOCUMENTS

| 5,129,368 | 7/1992 | Kristl et al. | 123/184.55 |
| 5,133,308 | 7/1992 | Hitomi et al. | 123/184.57 |
| 5,309,883 | 5/1994 | Pischke | 123/184.55 |

FOREIGN PATENT DOCUMENTS

| 0109229 | 5/1988 | Japan | 123/184.53 |
| 0109227 | 5/1988 | Japan | 123/184.55 |
| 0109225 | 5/1988 | Japan | 123/184.53 |
| 4101016 | 4/1992 | Japan | 123/184.36 |
| 5086869 | 4/1993 | Japan | 123/184.26 |

*Primary Examiner*—Marguerite Macy
*Attorney, Agent, or Firm*—Burns, Doane, Swecker & Mathis LLP

[57] ABSTRACT

An intake system for internal combustion engines with multiple cylinders (10). The intake system includes a first distribution chamber (13), one separate inlet pipe (15a, 15b) for each engine cylinder, which inlet pipes extend between the first distribution chamber (13) and inlet valve/valves of the corresponding cylinders, and at least one second distribution chamber (16, 16a, 16b). This is connectable to each inlet pipe (15a, 15b) between said first chamber and the inlet valve via one corresponding passage, which can be opened by means of an operable throttle valve (19). Each second distribution chamber (16, 16a, 16b) is connected to the first distribution chamber (13) via at least one resonance pipe (14), the inlet of which to the second distribution chamber is openable by means of an additional throttle valve (17).

4 Claims, 3 Drawing Sheets

INTAKE SYSTEM FOR MULTIPLE CYLINDER COMBUSTION ENGINES

TECHNICAL FIELD

Intake systems for combustion engines with multiple cylinders, including a first distribution chamber, one inlet pipe arranged separately for each engine cylinder, which inlet pipes extend between the first distribution chamber and the inlet valve/valves for each cylinder, and at least a second distribution chamber, which is connectable to each one of the inlet pipes between said first chamber and the inlet valve each via one passage each, which is openable by means of simultaneously operable throttle valves.

BACKGROUND OF THE INVENTION

It is known at internal combustion engines used within a relatively broad range of revolutions, that the gas volume sucked in at a certain number of revolutions can be increased by tuning the length and diameter of the inlet pipes, thereby also increasing the so-called volumetric efficiency of the engine. This depends on, that the gas quantity present in the intake system is influenced by the operating frequency of the inlet valves, so that the gas comes in resonance oscillation. When the oscillation period corresponds to the operating frequency of the valves, the abovementioned increase of the volumetric efficiency is obtained. Consequently, at certain numbers of revolution a higher volumetric efficiency is achieved with a long inlet pipe, whereas at other numbers of revolution a short inlet pipe gives a higher volumetric efficiency.

It is also earlier known, for example from EP 0182223, to provide an extra air distribution chamber, which is placed between the first distribution chamber and the inlet valves and which is connected to each inlet pipe via an openable throttle. By means of this arrangement the efficient length on the inlet pipes can be varied, whereby opening of the throttles gives an increase of the volumetric efficiency within a higher range of revolutions.

It is desirable to place the point for transition from the first adjustment stage to the second adjustment stage at such a point and with such overlapping of the two curves, that no marked drop in torque is experienced, in said transition area. Hereby the positive effect of these known arrangements in reality becomes rather limited.

THE TECHNICAL PROBLEM

The object of the present invention is to provide an intake system of the type initially mentioned, which permits utilization of the intake system resonance frequency for an advantageous volumetric efficiency within such a broad range of revolutions as possible.

The solution

This has been achieved according to the invention in that each second distribution chamber is connected to the first distribution chamber via a resonance pipe, the inlet of which to the second distribution chamber is openable by means of an additional throttle valve, which is operable simultaneously with the other throttle valves.

By addition of the resonance pipe it has been possible to tune the resonance frequency for the adjustment stage with short inlet pipes in such a manner, that the positive effect becomes substantially higher than at known variable intake systems.

DESCRIPTION OF THE DRAWINGS

Hereinafter the invention will be described more in detail with reference to embodiments shown in the enclosed drawings, on which FIG. 1 discloses schematically a first variant of the intake system according to the invention.

DESCRIPTION OF EMBODIMENTS

Figure 1:
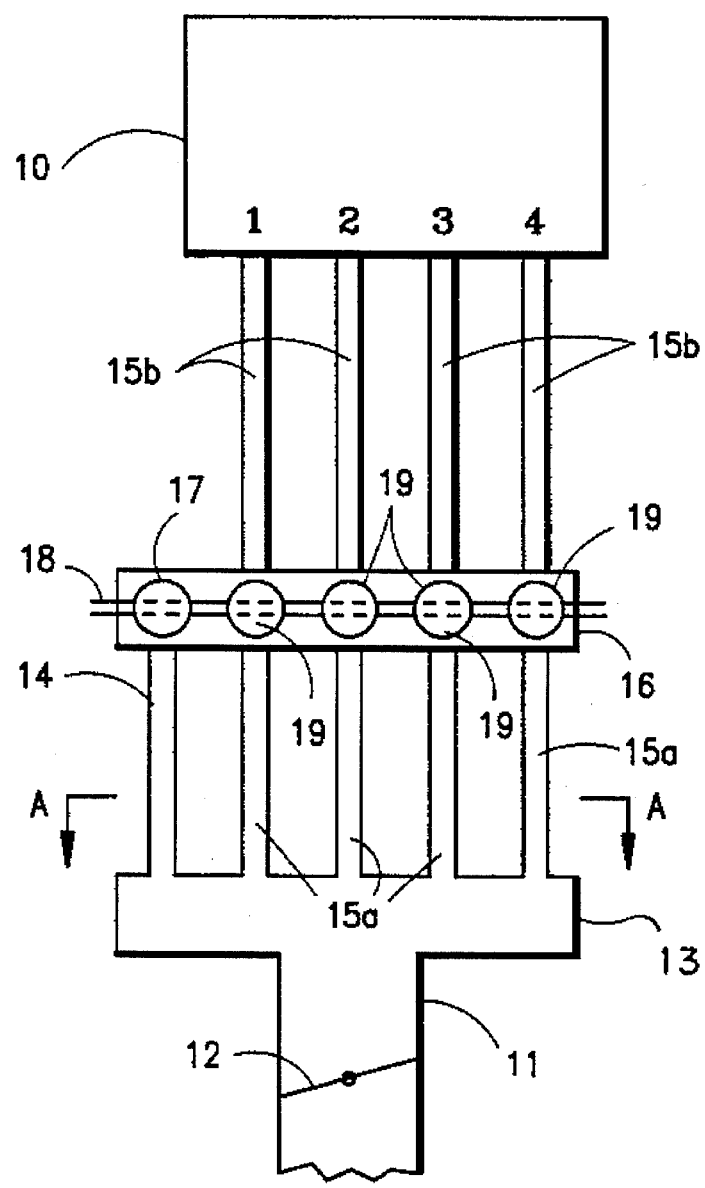
FIG. 1A is a cross-sectional view of the invention of FIG. 1, taken along line A—A.
Figure 1A:
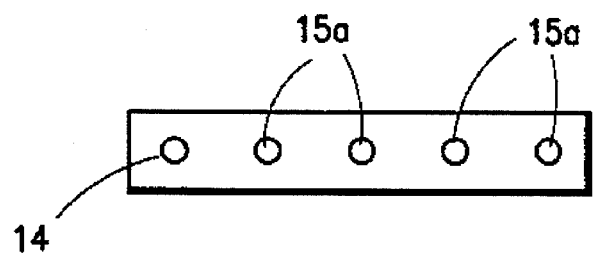

FIG. 1 discloses an intake system of a four-cylinder internal combustion engine 10. The intake system includes an outlet spigot 11 from a non disclosed air filter housing. In the outlet spigot is provided a throttle valve 12, for adjustment of the flow volume of the cleaned intake air.

The outlet spigot 11 opens in a first distribution chamber 13, from which extend one resonance pipe 14 and four inlet pipes 15a, 15b. The resonance pipe 14 extends to the second distribution chamber 16 situated between the first distribution chamber 13 and the motor 10, where the outlet of the pipe 14 to the chamber 16 can be opened and closed by means of a throttle 17, which is mounted on a rotatable axis 18.

The inlet pipes 15a, 15b extend all the way up to each inlet valve in the motor 10 and are each therebetween connected via a not shown manifold to the second distribution chamber 16. The passages via the manifolds can be opened and closed by means of throttles 19, which are preferably mounted on the same turnable shaft 18 as the throttle 17. Alternatively the throttles 19 can be mounted on a shaft which is operable separately relative to the shaft 18.

Figure 3:
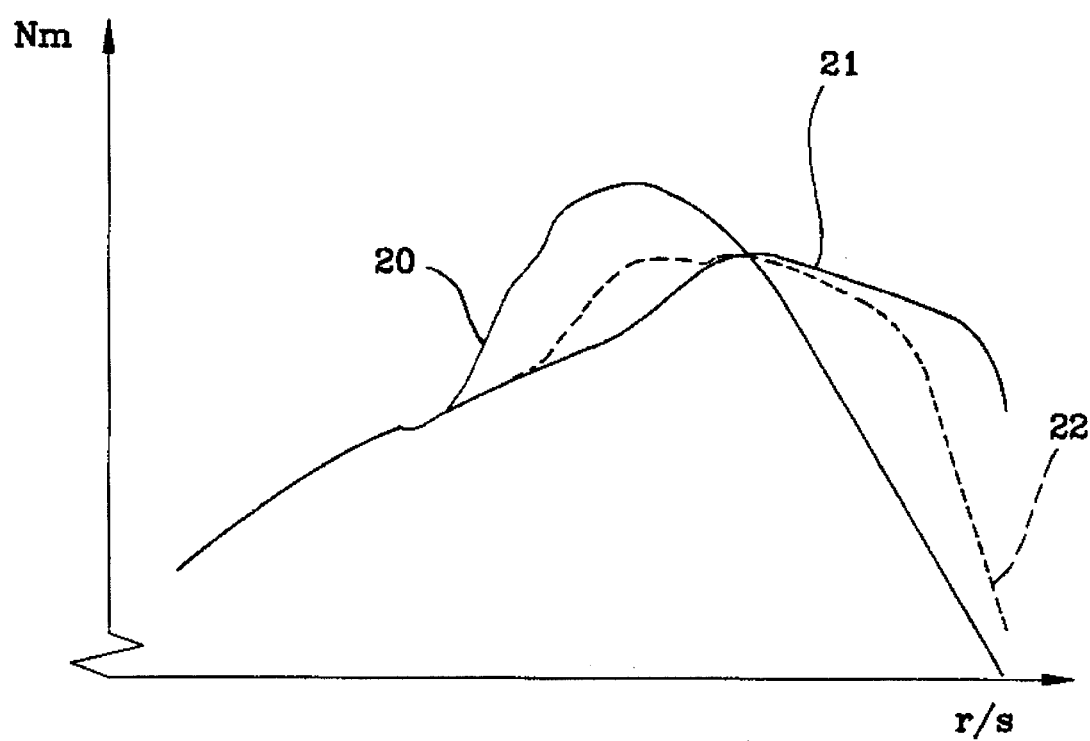
FIG. 3 is a diagram, which illustrates the technical effect of the intake system according to the invention.

FIG. 3 shows in diagrammatic form the function of the intake system, whereby the horizontal axis indicates increasing number of revolutions r/s and the vertical axis increasing torque Nm.

Within a low range of revolutions, which is illustrated with the graph 20, an appropriate torque is obtained with closed throttles 17 and 19. Hereby the oscillation period of the air volume in the intake system is determined by the total acoustic length of the pipe parts 15a, 15b.

Within a higher range of revolutions, which is illustrated by the graph 21, an appropriate torque is obtained with open throttles 17 and 19. Hereby the oscillation period of the air volume in the inlet system is determined by the acoustic length of the pipe part 15b, in combination with the acoustic length of the resonance pipe 14. The effect of The resonance pipe 14 appears by the dashed part 12 of the graph 21, which discloses the torque at an intake system according to FIG. 1, which has no resonance pipe 14.

Figure 2:
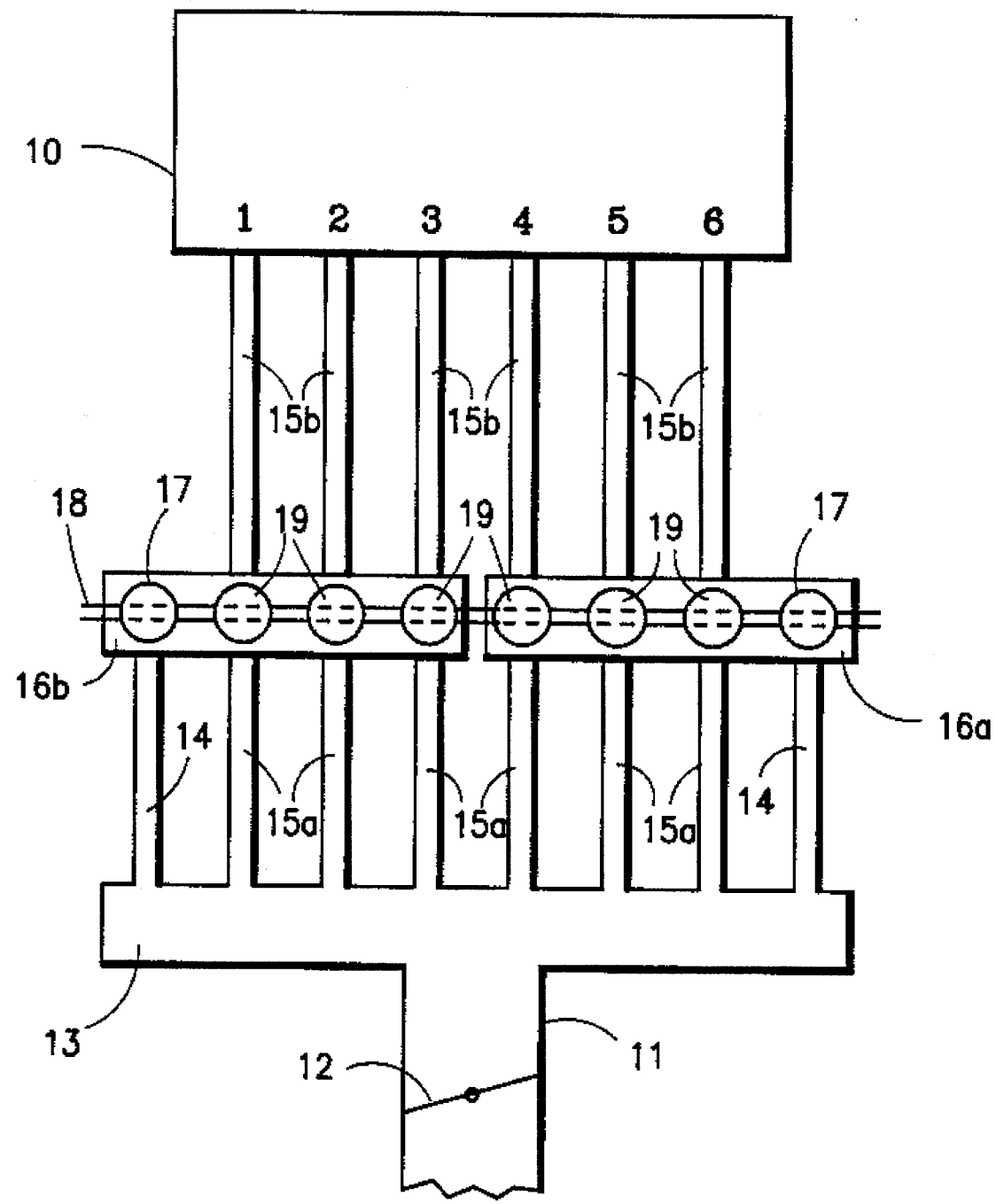
FIG. 2 shows in a corresponding manner a second variant of the invention.

FIG. 2 discloses an intake system of an internal combustion engine 10 having six cylinders. The intake system is basically developed in the same manner as the proceeding embodiment, except for the second distribution chamber being divided in two partial chambers 16a, 16b. Each of these is connected via not shown, throttle controlled manifolds with three of the inlet pipes 15a, 15b. Each of the two partial chambers 16a, 16b is furthermore connected to the first distribution chamber via a resonance pipe 14, the openings of which to the partial chambers 16a, 16b can be opened and closed by means of throttles 17.

The adjustment of the throttles 17, 19 occurs in both embodiments preferably by means of a revolution sensor. All throttles 17, 19 are suitably provided along a common shaft 18, so that they are opened and closed at the same time.

Alternatively the throttles 19 can open when a revolution level is exceeded, and then throttle 17 when a further higher revolution level is exceeded.

The resonance pipe 14 makes it possible to tune the resonance frequency for the adjustment stage with short inlet pipes by dimensioning the acoustic length and cross-sectional area of the pipe.

The invention is of course not limited to the shown embodiments, but a number of modifications are conceivable within the scope of the following claims, and consequently the invention can of course also be applied to engines with a larger or smaller number of cylinders than the four and six cylinders described. Further the cylinders, which are arranged in even ignition sequence are grouped in the same group.

We claim:

1. Intake system for internal combustion engines with multiple cylinders comprising: a first distribution chamber, one separate inlet pipe for each engine cylinder, which inlet pipes extend between the first distribution chamber and inlet valves of the corresponding cylinders, and at least a second distribution chamber, which is connectable to each one of the inlet pipes between said first chamber and the inlet valve via one passage each, which passages can be opened by means of an operable throttle valve, said second distribution chamber is connected to the first distribution chamber via at least one resonance pipe, the inlet of which to the second distribution chamber is openable by means of an additional throttle valve wherein the at least one resonance pipe has the same acoustic length as the acoustic length of the inlet pipes.

2. Intake system according to claim 1, wherein the additional throttle valve is operable simultaneously with the other throttle valves.

3. Intake system according to claim 2, wherein the throttle valves are mounted on a common manoeuvring shaft.

4. Intake system according to claim 1, wherein the acoustic cross-sectional area of the at least one resonance pipe differs from the acoustic cross-sectional area of the inlet pipes.

* * * * *